United States Patent
Kim et al.

(10) Patent No.: US 8,849,048 B2
(45) Date of Patent: Sep. 30, 2014

(54) APPARATUS FOR DECODING IMAGE DATA BASED ON AVAILABILITY OF REFERENCE DATA AND METHOD THEREOF

(75) Inventors: Min Soo Kim, Yongin-si (KR); Joon Ho Song, Hwaseong-si (KR); Shi Hwa Lee, Gangnam-gu (KR); Do Hyung Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 136 days.

(21) Appl. No.: 13/373,239

(22) Filed: Nov. 9, 2011

(65) Prior Publication Data

US 2012/0121196 A1    May 17, 2012

(30) Foreign Application Priority Data

Nov. 12, 2010    (KR) .................. 10-2010-0112455

(51) Int. Cl.
| G06K 9/36 | (2006.01) |
| G06K 9/46 | (2006.01) |
| H04N 7/12 | (2006.01) |
| H04N 11/02 | (2006.01) |
| H04N 19/44 | (2014.01) |
| H04N 19/436 | (2014.01) |

(52) U.S. Cl.
CPC ... *H04N 19/00533* (2013.01); *H04N 19/00521* (2013.01)
USPC ....... 382/233; 382/238; 382/239; 375/240.12

(58) Field of Classification Search
USPC .............. 382/233, 238, 239; 375/240.12
See application file for complete search history.

(56) References Cited

U.S. PATENT DOCUMENTS

| 7,155,063 | B2 * | 12/2006 | Chiba ........................... 382/233 |
| 7,796,692 | B1 * | 9/2010 | Falardeau et al. ........ 375/240.12 |
| 2009/0285490 | A1 * | 11/2009 | Hotta et al. .................... 382/195 |
| 2010/0004793 | A1 * | 1/2010 | Ohkuwa et al. .............. 700/295 |
| 2010/0118960 | A1 * | 5/2010 | Nonogaki ................. 375/240.16 |
| 2011/0150351 | A1 * | 6/2011 | Singh et al. .................... 382/234 |
| 2011/0188768 | A1 * | 8/2011 | Pateux et al. ................. 382/238 |

FOREIGN PATENT DOCUMENTS

| JP | 06-149751 | 5/1994 |
| JP | 08-328933 | 12/1996 |
| JP | 2007-325119 | 12/2007 |
| JP | 2009-267689 | 11/2009 |
| KR | 10-2006-0106953 | 10/2006 |
| KR | 10-2007-0119723 | 12/2007 |
| KR | 10-2008-0048262 | 6/2008 |
| KR | 10-2008-0060188 | 7/2008 |
| WO | WO 2010001045 A1 * | 1/2010 .............. H04N 7/26 |

* cited by examiner

*Primary Examiner* — Bernard Krasnic
(74) *Attorney, Agent, or Firm* — Staas & Halsey LLP

(57) ABSTRACT

An image data decoding apparatus and method are based on an availability of reference data. The image data decoding apparatus may include a core to process decoding of image data, and an availability determining device to receive, from the core, availability verification request information with respect to a reference area of a first frame included in the image data, to determine an availability with respect to the reference area based on the received availability verification request information, and to transmit, to the core, the determined availability. When the reference area is available, the core may process decoding of a second frame based on the reference area.

17 Claims, 6 Drawing Sheets

AVAILABILITY INFORMATION 410

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 1 | 1 |
| 0 | 0 | 0 | 0 | 0 | 1 | 1 | 1 |
| 0 | 0 | 0 | 1 | 1 | 1 | 1 | 1 |
| 0 | 0 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |

411

412

APPARATUS FOR DECODING IMAGE DATA BASED ON AVAILABILITY OF REFERENCE DATA AND METHOD THEREOF

CROSS-REFERENCE TO RELATED APPLICATIONS

This application claims the priority benefit of Korean Patent Application No. 10-2010-0112455, filed on Nov. 12, 2010, in the Korean Intellectual Property Office, the disclosure of which is incorporated herein by reference.

BACKGROUND

1. Field

Example embodiments relate to an image data decoding method and apparatus based on an availability of a decoded reference data.

2. Description of the Related Art

Conventionally, when image data is divided into a plurality of macro blocks to perform parallel processing, the parallel processing is performed based on data processed in advance.

Particularly, when the image data is decoded to perform the parallel processing, image data processed in advance may be used to process a current data unit. Accordingly, a dependency may exist between data to decode image data. Therefore, an availability of the data processed in advance may be determined to decode the image data based on the parallel processing. To determine the availability of the data processed in advance, a core may calculate an area of which the availability is to be determined, may access a memory that stores availability information to determine the availability of the calculated area, and may obtain the availability information.

When a plurality of cores are used to perform the parallel processing, an area to be used for storing the availability information needs to be located in a shared area, which is accessible to each of the plurality of cores and thus, may be located outside the core. As the cores access the stored availability information, overhead caused by accessing data may increase.

A memory may store a single piece of availability information for each storage space of 32 bits or 64 bits to enable the core to readily access the data and thus, the memory may be significantly wasted. Also, as a size of an image to be processed increases, a requested capacity of a memory may increase.

SUMMARY

The foregoing and/or other aspects are achieved by providing an image decoding apparatus, the apparatus including a core to process decoding of image data, and an availability determining device to receive, from the core, availability verification request information with respect to a reference area of a first frame included in the image data, to determine an availability with respect to the reference area based on the received availability verification request information, and to transmit, to the core, the determined availability. Wherein, when the reference area is available, the core may process decoding of a second frame based on the reference area.

The foregoing and/or other aspects are achieved by providing an image decoding method, including receiving, from a core, availability verification request information with respect to a reference area of a first frame included in image data, determining the reference area based on the received availability verification request information, determining an availability with respect to the determined reference area, and generating availability information based on a result of the determination, and transmitting, to the core, the generated availability information. Wherein, the core may determine, based on the received availability information, whether the reference area is available, and may process, based on the reference area, decoding of a second frame included in the image data when the reference area is available.

The forgoing and/or other aspects are achieved by providing an image decoding method including receiving, from a core, availability verification request information corresponding to a reference area of a frame included in image data, determining an availability of the reference area and providing availability information to the core, and when the availability information indicates that the reference area is available, decoding another frame included in an image database on the reference area by using the core.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 4 is a diagram of availability information stored in an availability determining device according to example embodiments;

DETAILED DESCRIPTION

Figure 1:
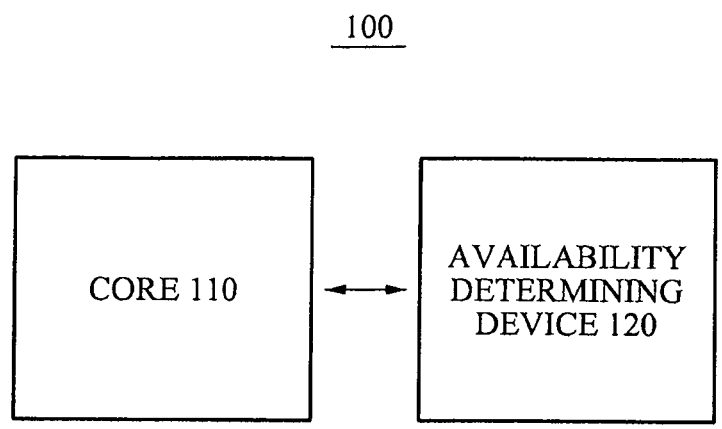
FIG. 1 is a diagram of an image decoding apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 is a diagram of an image decoding apparatus 100 according to example embodiments. The image decoding apparatus 100 may include a core 110 and an availability determining device 120.

The core 110 may process decoding of image data. In this example, the image data may be decoded by referring to data decoded in advance. The availability determining device 120 may determine whether the data to be used by the core 110 for the decoding is decoded.

In the present specification, the determining of whether the data to be used by the core 110, is decoded may be understood as determining an availability of reference data.

The core 110 may transmit, to the availability determining device 120, minimum information associated with a reference area of reference data, to decode the image, and may determine an availability with respect to the reference area from the availability determining device 120.

The availability determining device 120 may receive, from the core 110, availability verification request information with respect to a reference area of a first frame included in the image data, may determine, based on the received availability verification request information, the availability with respect to the reference area, and may transmit the determined availability to the core 110.

The availability verification request information may be the minimum information that the core 110 transmits to the availability determining device 120 to determine the availability, and may include information associated with at least one of a current position with respect to the reference area, a motion vector, a reference index, and a partition index.

The availability determining device 120 may use the minimum information, to identify the reference area, for which the core 110 is to determine the availability. When the availability with respect to the reference area is determined, the core 110 may decode a predetermined frame based on the reference area.

Although FIG. 1 illustrates an image data decoding process, using a single core 110, the image data decoding process may be applicable to parallel processing based on a plurality of cores 110. For example, when two cores perform decoding of the image data in parallel, the two cores may respectively transmit, to the availability determining device 120, minimum information used for determining an availability, that is, availability verification request information.

The availability determining device 120 may determine respective reference areas of the transmitted availability verification request information, and may determine an availability for each of the reference areas. The availability determining device 120 may include a storage device, and may record and maintain availability information in the storage device. When the availability verification request information is received from the core 110, the core 110 may determine an availability with respect to a corresponding reference area by referring to the storage device.

The availability information maintained in the storage device may include information associated with whether macro blocks of a frame are decoded. The availability information may need to include only information associated with whether each of the macro blocks is decoded and thus, may record a single macro block with data of 1 bit. For example, the availability information may be classified as '0' when the macro block is decoded and may be classified as '1' when the macro block is not decoded.

When the core 110 completes the decoding of the reference area, the core 110 may transmit information indicating that the decoding is completed to the availability determining device 120, to request an update of the availability information. When the reference area is not available, the availability determining device 120 may monitor whether the reference area is available. Accordingly, when the reference area becomes available, the availability determining device 120 may inform, using a bypass signal interrupt, that the reference area is available and thus, may enable the core 110 to operate effectively.

According to example embodiments, a load of the core 110 may be distributed since the core 110 does not determine an availability with respect to a reference area. The core 110 may decode image data with a small amount of calculation and minimal memory access.

In terms of efficiency of the core 110, waste of a memory block may be prevented since availability information may be stored with 1 bit, as opposed to a conventional scheme that stores the availability information with 32 bits or 64 bits.

Figure 2:
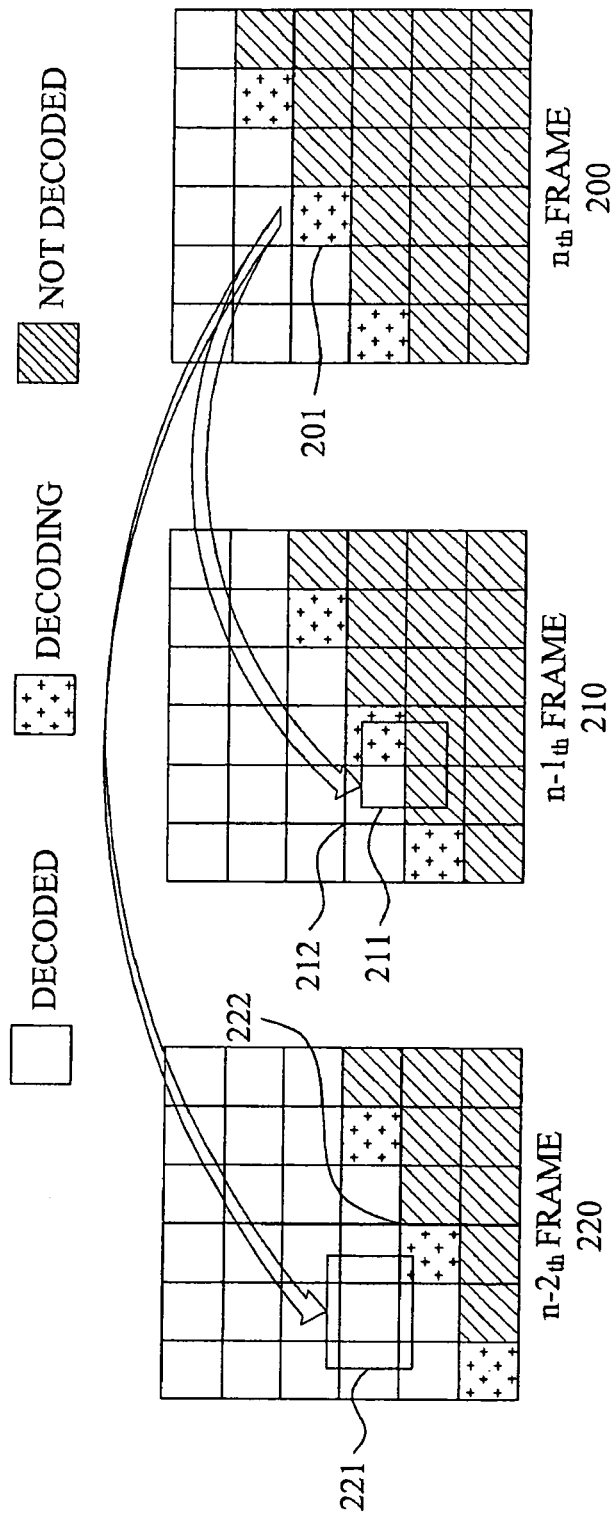
FIG. 2 is a diagram illustrating a dependency between frames in an image decoding apparatus according to example embodiments.

FIG. 2 illustrates a dependency between frames in an image decoding apparatus according to example embodiments. When three frames are simultaneously decoded, the core 110 may refer to a part of two previous frames 210 and 220 to decode a macro block 201 in an $n^{th}$ frame 200.

A single macro block may simultaneously refer to a plurality of macro blocks in previous frames and thus, the availability determining device 120 may calculate a reference area 211 of the $n-1^{th}$ frame 210 and a reference area 221 of the $n-2^{th}$ frame 220, and may determine whether each area is available.

A macro block 212 among macro blocks corresponding to the reference area 211 may be decoded in advance and be available, and remaining macro blocks are currently being decoded or may not be decoded. Accordingly, the reference area 211 may be determined to be unavailable.

Macro blocks in the reference area 221 may be all decoded and be available excluding a macro block 222 that is currently being decoded. However, the reference area 221 may be determined to be unavailable due to the macro block 222.

When all macro blocks corresponding to the reference areas are completely decoded, the availability determining device 120 may determine a corresponding reference area to be available and may inform the core that the reference area is available using a bypass signal interrupt.

Figure 3:
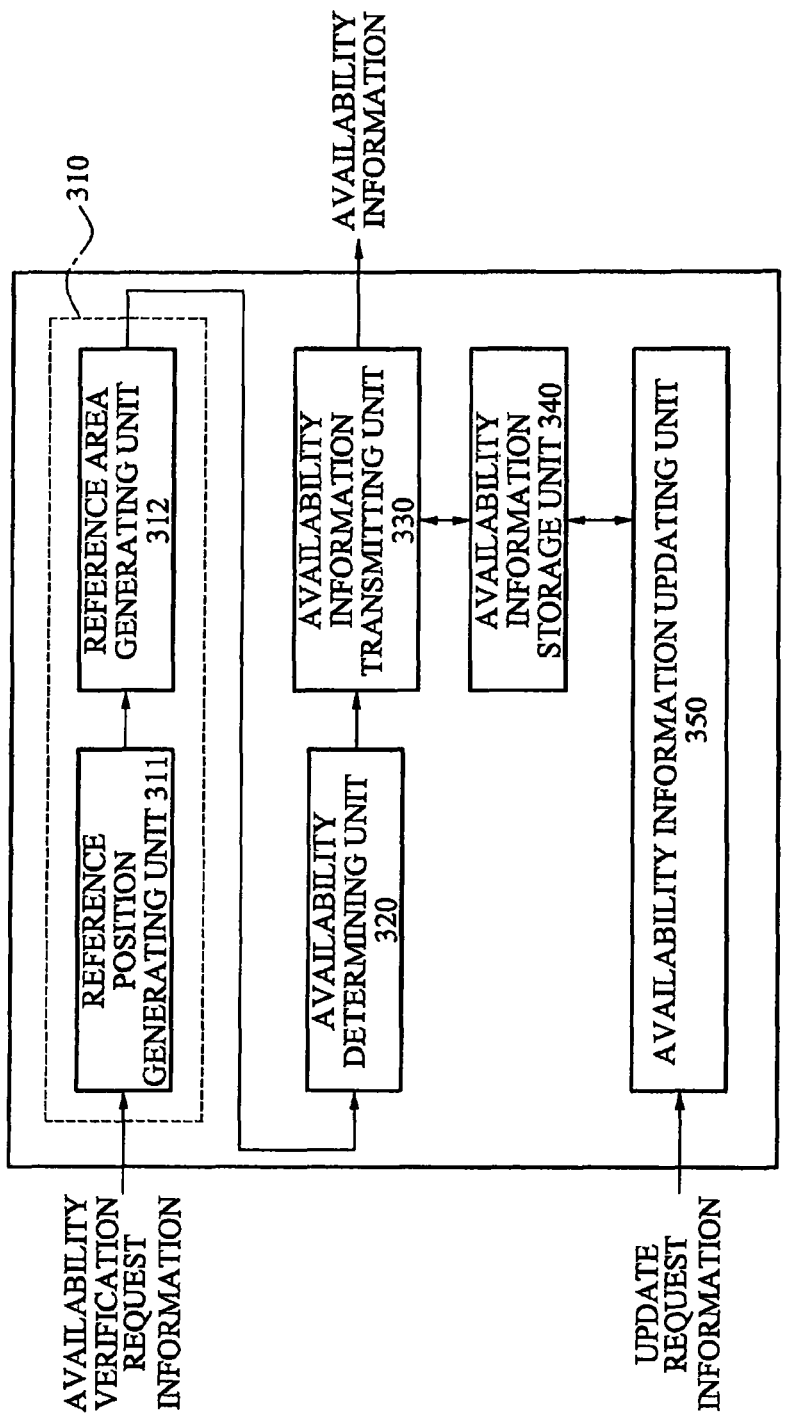
FIG. 3 is a block diagram of an availability determining device according to example embodiments.

FIG. 3 is a diagram of an example of an availability determining device 300 (corresponding to availability determining device 120) according to example embodiments. The availability determining device 300 may include a reference area determining unit 310, an availability determining unit 320, and an availability information transmitting unit 330.

The reference area determining unit 310 may determine a reference area based on availability verification request information received from a core (for example core 110 in FIG. 1). The reference area determining unit 310 may include a reference position generating unit 311 and a reference area generating unit 312. The reference area determining unit 310 may determine the reference area based on the received availability verification request information, and the received availability verification request information may include at least one of a current position, a motion vector, a reference index, and a partition index.

The reference position generating unit 311 may determine a reference position for determining the reference area, based on the current position, and the reference area generating unit 312 may determine, based on information associated with the motion vector, an area that is based on the current position.

The reference index may be used when a reference area is located in a plurality of frames, and the partition index may be used for distinguishing a partition where the reference area exists in a frame divided into a plurality of partitions.

The availability determining unit 320 may determine an availability with respect to the determined reference area, and may generate, based on the determined availability, availability information associated with the determined reference area. The availability determining unit 320 may allocate 1 bit for each macro block to distinguish whether the reference area is available and thus, may generate the availability information.

The availability information transmitting unit 330 may transmit the generated availability information to the core 110, and may inform the core 110 whether the determined reference area is available. The core 110 may determine whether the reference area is available based on the received availability information, and, when the reference area is available, the core 110 may perform decoding of a predetermined macro block based on the reference area.

The availability determining device 300 may further include an availability information storage unit 340 and an availability information updating unit 350. The availability information storage unit 340 may store information associated with reference areas of which availabilities are determined, that is, availability information. The availability determining unit 320 may compare the determined reference area with corresponding availability information stored in the availability information storage unit 340 and may determine the availability with respect to the determined reference area.

When the availability information updating unit 350 determines the availability with respect to the determined reference area, the availability information updating unit 350 may update, in the availability information storage unit 340, the availability information associated with the determined reference area.

When the core 110 completes decoding a predetermined macro block, the availability information updating unit 350 may be informed by the core 110 that decoding of the predetermined macro block is completed. In this example, the availability information updating unit 350 may update, with 1 bit, the availability information associated with the predetermined macro block.

A process that updates the availability information when the availability information is received from the core 110 will be described with reference to FIG. 4. FIG. 4 is a diagram which illustrates availability information stored in the availability determining device 300 according to example embodiments.

The availability determining device 300 may record the availability information, and may include an availability information storage unit 400 (corresponding to availability information storage unit 340) to maintain the availability information. The availability information storage unit 400 may store availability information corresponding to respective frames included in image data.

For example, the availability information storage unit 400 may store availability information 410 corresponding to an $n^{th}$ frame. The availability information 410 may include information associated with availabilities with respect to macro blocks included in the $n^{th}$ frame.

In a case when a predetermined macro block is decoded, a storage space for 1 bit corresponding to the predetermined macro block in the $n^{th}$ frame may be updated to be '0'. In another case when the predetermined macro block is not decoded, the storage space for 1 bit corresponding to the predetermined macro block in the $n^{th}$ frame may be updated to be '1'. In yet another case when a reference area 411 is determined based on the availability verification request information received from the core 110, the availability determining device 300 may determine the availability information 410 and may determine that all macro blocks corresponding to the reference area 411 are decoded. Accordingly, the availability determining device 300 may determine that the reference area 411 is available, and the core 110 may perform decoding based on the reference area 411.

The core 110 may inform the availability determining device 300 of information associated with a macro block that is completely decoded, and may request updating of availability information with respect to the macro block. Accordingly, the availability determining device 300 may update the availability information.

When the reference area 412 is determined based on the availability verification request information received from the core, the availability determining device 300 may determine that decoding of macro blocks, that are classified as '1,' are not completed yet. Accordingly, the availability determining device may determine that the reference area 412 is unavailable.

Figure 5:
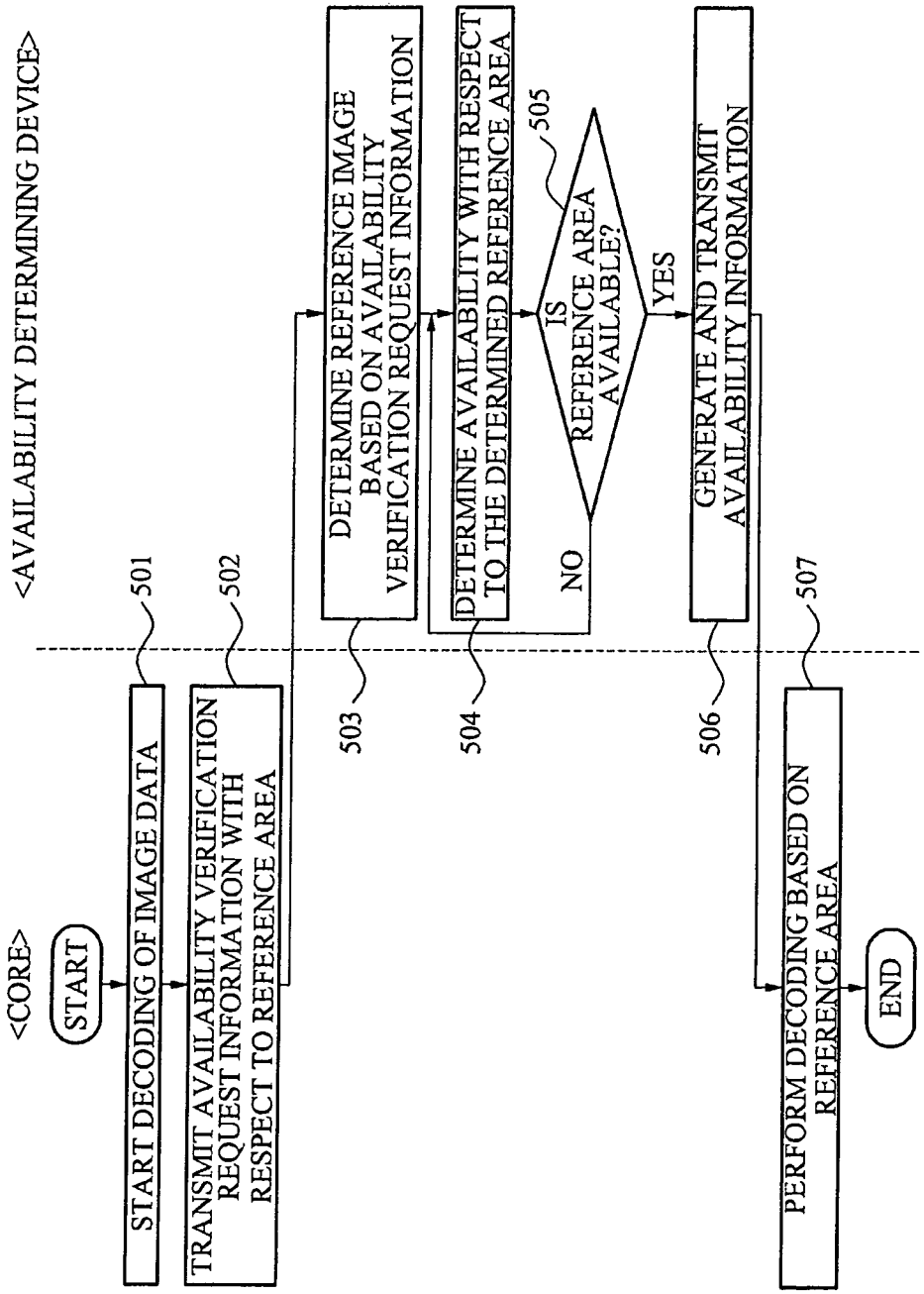
FIG. 5 is a flowchart illustrating an image decoding method according to example embodiments.

FIG. 5 illustrates an image decoding method according to example embodiments. According to the image decoding method, the core 110 may start decoding image data in operation 501.

When the decoding is started, the core 110 may transmit, to the availability determining device 300, availability verification request information with respect to a reference area to be used by the core 110 for decoding a predetermined macro block in operation 502.

The availability determining device 300 may receive the availability verification request information, and may determine, based on the received availability verification request information, the reference area for which an availability is to be determined in operation 503.

The availability determining device 300 may determine an availability with respect to the determined reference area in operation 504, and may determine whether the determined reference area is available in operation 505. When the determined reference area is unavailable, the availability determining device 300 may proceed with operation 504 again to determine whether the determined reference area is available. When the determined reference area is available, the availability determining device 300 may generate availability information and may transmit the generated availability information to the core 110 in operation 506. In this example, the availability determining device 300 may not transmit the generated availability information as is, and may transmit brief information associated with whether the reference area is available.

The core 110 may receive the availability information with respect to the reference area, and may perform decoding based on the reference area in operation 507. The reference area may be located in a first frame, and the decoding may be performed in a second frame.

Figure 6:
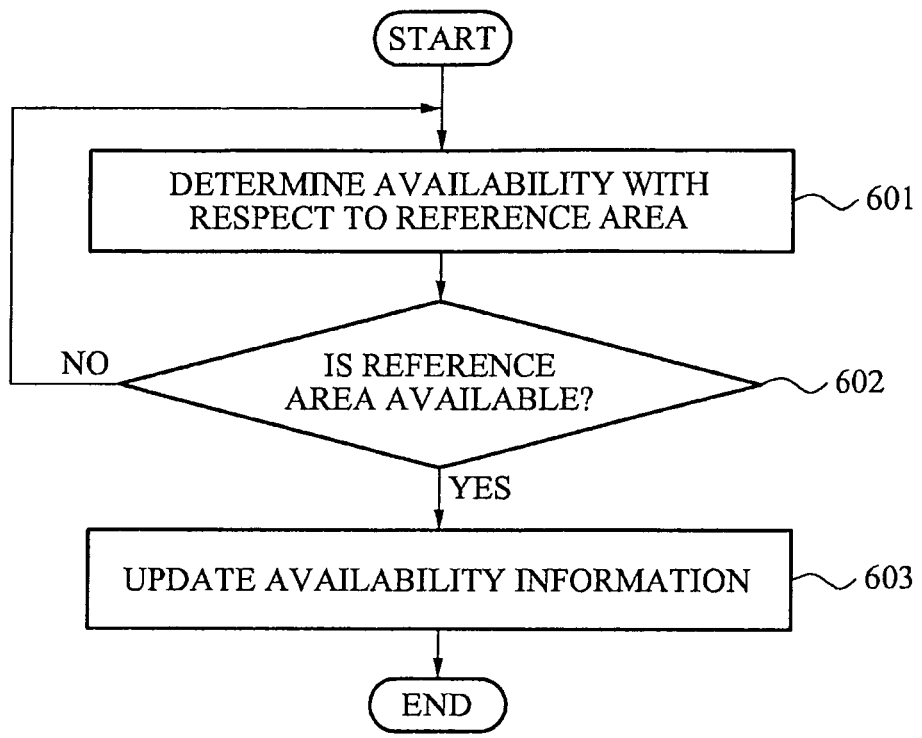
FIG. 6 is a flowchart illustrating updating of availability information according to example embodiments.

FIG. 6 illustrates updating of availability information according to example embodiments. The availability determining device 300 may determine an availability with respect to a reference area in operation 601, and may determine whether the reference area is available in operation 602. When the reference area is available, the availability determining device 300 may update stored availability information in operation 603. For another example, when a core 110 completes decoding, the core 110 may transmit, to the availability determining device 300, information associated with a frame or a macro block for which the decoding is completed. In this example, the availability determining device 300 may determine the information associated with the frame or the macro block for which the decoding is completed, and may update the availability information accordingly.

When parallel processing is performed based on data division, for example, when image data is decoded based on a multi-core, inefficiency caused by calculating an availability of reference data to be used for the decoding may be removed.

In general, a core may calculate the reference area to directly determine the availability of the reference data. Therefore, the core may have a high probability of causing overhead, due to a waste of calculation and frequent memory access. According to example embodiments, a separate device may be used to determine the availability of the reference data and thus, the core may effectively perform calculation and may significantly reduce possible overhead.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it will be appreciated by those skilled in the art that changes may be made in these embodiments without departing from the principles and spirit of the disclosure, the scope of which is defined by the claims and their equivalents.

What is claimed is:

1. An apparatus to decode an image, comprising:
   a plurality of cores to process decoding of image data;
   an availability information storage device to store availability information comprising a plurality of bits, wherein each bit of the plurality of bits corresponds to each macro block of a plurality of macro blocks of a frame, and each bit of the plurality of bits indicates whether each corresponding macro block of the frame is decoded; and
   a processor comprising:
   an availability determining device to receive, from the plurality of cores, availability verification request information with respect to a reference area of a first frame included in the image data, to determine an availability of the reference area based on the received availability verification request information, and to transmit, to the plurality of cores, the determined availability,
   wherein, when decoding of a macro block is completed, the plurality of cores requests an update of the availability information based on the macro block of which decoding is completed, and the availability determining device updates the availability information in response to the received request for update, and
   wherein, when the reference area is available, the plurality of cores processes decoding of a second frame in the image data based on the reference area.

2. The apparatus of claim 1, wherein the availability verification request information is information that requests verification of whether macro blocks corresponding to the reference area are decoded.

3. The apparatus of claim 2, wherein, when all the macro blocks corresponding to the reference area are decoded, the availability determining device determines that the reference area is available.

4. The apparatus of claim 1, wherein the availability verification request information comprises at least one of a current position with respect to the reference area, a motion vector, a reference index, and a partition index.

5. The apparatus of claim 4, wherein the availability determining device receives the availability verification request information, and determines the reference area.

6. The apparatus of claim 1, wherein the availability determining device comprises:
   a reference area determining unit to determine the reference area, based on the received availability verification request information;
   an availability determining unit to determine the availability of the determined reference area, and to generate availability information based on a result of the availability determination; and
   an availability information transmitting unit to transmit, to the plurality of cores, the generated availability information,
   wherein the plurality of cores determines, based on the received availability information, whether the reference area is available.

7. The apparatus of claim 6, wherein the availability determining unit refers to the availability information storage unit, and compares the determined reference area with corresponding availability information stored in the availability information storage unit to determine the availability of the determined reference area.

8. The apparatus of claim 6, further comprising:
   a processor comprising:
   an availability information updating unit to update, in the availability information storage unit, information associated with the determined reference area when the availability of the determined reference area is determined.

9. The apparatus of claim 1, wherein a position of each bit of the plurality of bits corresponds to a position of the corresponding macro block.

10. A method of decoding an image, comprising:
    storing availability information comprising a plurality of bits, wherein each bit of the plurality of bits corresponds to each macro block of a plurality of macro blocks of a frame, and each bit of the plurality of bits indicates whether each corresponding macro block of the frame is decoded;
    receiving, from a plurality of cores, availability verification request information of a reference area of a first frame included in image data;
    determining the reference area based on the received availability verification request information;
    determining an availability of the determined reference area, and generating availability information based on a result of the availability determination; and
    transmitting, to the plurality of cores, the generated availability information,
    wherein, when decoding of a macro block is completed, the plurality of cores requests an update of the availability information based on the macro block of which decoding is completed, and the availability information is updated in response to the received request for update, and
    wherein the plurality of cores determines, based on the generated availability information, whether the reference area is available, and processes, based on the reference area, decoding of a second frame included in the image data when the reference area is available.

11. The method of claim 10, wherein the determining the availability comprises:
    determining whether macro blocks corresponding to the determined reference area are decoded.

12. The method of claim 10, wherein the determining the availability comprises:
    comparing the determined reference area with corresponding availability information stored in an availability information storage unit to determine the availability of the determined reference area.

13. The method of claim 10, further comprising:
updating the stored corresponding availability information based on information associated with the determined reference area when the availability of the determined reference area is determined.

14. A non-transitory computer-readable medium comprising a program for instructing a computer to perform the method of claim 10.

15. A method of decoding an image comprising:
storing availability information comprising a plurality of bits, wherein each bit of the plurality of bits corresponds to each macro block of a plurality of macro blocks of a frame, and each bit of the plurality of bits indicates whether each corresponding macro block of the frame is decoded;
receiving, from a plurality of cores, availability verification request information corresponding to a reference area of a frame included in image data;
determining an availability of the reference area and providing availability information to the plurality of cores;
when decoding of a macro block is completed, the plurality of cores requests an update of the availability information based on the macro block of which decoding is completed, and the availability information is updated in response to the received request for update; and
when the availability information indicates that the reference area is available, decoding another frame included in the image data based on the reference area by using the plurality of cores.

16. The method of claim 15, wherein the availability verification request information comprises a motion vector.

17. A non-transitory computer readable medium comprising a program for instructing a computer to perform the method of claim 15.

* * * * *